(12) United States Patent
Takeoka

(10) Patent No.: US 6,883,139 B2
(45) Date of Patent: Apr. 19, 2005

(54) MANUAL PROCESSING SYSTEM (75) Inventor: Makoto Takeoka, Minato-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 626 days.

(21) Appl. No.: 09/948,764

(22) Filed: Sep. 10, 2001

(65) Prior Publication Data
US 2002/0032707 A1 Mar. 14, 2002

(30) Foreign Application Priority Data
Sep. 12, 2000 (JP) .......................................... 2000-276148

(51) Int. Cl.$^7$ .............................................. G06F 17/00
(52) U.S. Cl. ..................................... 715/530; 707/104
(58) Field of Search ............................... 715/530, 515, 715/522, 523, 539, 525; 707/104

(56) References Cited

U.S. PATENT DOCUMENTS 5,940,846 A * 8/1999 Akiyama ................... 715/539
6,182,095 B1 * 1/2001 Leymaster et al. ......... 715/515
6,377,956 B1 * 4/2002 Hsu et al. ................ 707/104.1

* cited by examiner

Primary Examiner—Sanjiv Shah
(74) Attorney, Agent, or Firm—Oliff & Berridge, PLC (57) ABSTRACT A system is provided for processing a manual such as a maintenance manual of an airplane into a customized manual to provide a user with the manual. The document processing unit inserts insertion data in a manual document by referring to a manufacturer's additional dictionary, a user's additional dictionary, and a translation sentence insertion dictionary. Also, the data conversion unit implements a predetermined processing such as providing a layout to the manual document. Thereby, the system provides a manual of which contents and format are customized to a user company, in either electronic or paper-printed information.

21 Claims, 7 Drawing Sheets

| LOCATION OF INSERTION | DATE OF UPDATE | BULLETIN FILE NAME |
|---|---|---|
| 05-21-20-06 | 19970603 | 05me123.001 |
| TASK-05-21-20-810-123 | 19971103 | 05me234.001 |
| TOC-05 | 19981203 | 05me001.001 |

FIG. 4

| TAGGED ENGLISH SENTENCE | TAGGED JAPANESE SENTENCE |
|---|---|
| \<WARNING\>\<PARA\>MAKE SURE THAT THE CIRCUIT BREAKERS RELATED TO THE WEATHER RADAR ARE OPENED,SAFETIED AND TAGGED.\</PARA\>\</WARNING\> | \<WARNING\>\<PARA\>WEATHER RADAR に関する CIRCUIT BREAKER が OPEN であり、SAFETY CLAM、および TAG が付けられていることを確認する\</PARA\>\</WARNING\> |
| ⋮ | ⋮ |
| ⋮ | ⋮ |

FIG. 5

WARNING : MAKE SURE THAT THE CIRCUIT BREAKERS RELATED TO THE WEATHER RADAR ARE OPENED, SAFETIED AND TAGGED.

WEATHER RADAR に関する CIRCUIT BREAKER が OPEN してあり、SAFETY CLAM. および TAG が付けられていることを確認する。

FIG. 6

CHAPTER 27 - FLIGHT CONTROLS

<u>TABLE OF CONTENTS</u>

| SUBJECT | CH/SE/SU | PAGE | EFFECT |
|---|---|---|---|
| <u>FLIGHT CONTROLS</u> | 27-00-00 | | |
| DESCRIPTION AND OPERATION | | 001 | ALL |
| MAINTENANCE PRACTICES | | 201 | ALL |
| INSTALLATION OF THE.... | | 201 | ALL |
| <u>AILERON</u> | | | |
| DESCRIPTION AND OPERATION | 27-10-00 | 001 | ALL |
| AILERON AND HYDRAULIC ACTUATION | | | |
| DESCRIPTION AND OPERATION | 27-14-00 | 001* | ALL |

FIG. 7

LIST OF EFFECTIVE PAGE BLOCKS

| CH-SE-SB | PAGE/BLTN NO | DATE |
|---|---|---|
| 27-00-00 | 201 | APL 05/97 |
| 27-14-00 | 401 | DEC 10/97 |
|  | 501 | NOV 01/97 |
|  | R 601 | JAL 09/97 |
| 27-14-41 | 401 | OCT 21/98 |
|  | B 27-123 | JUN 21/97 |

R:REVISED  A:ADDED  D:DELETED  B:BULLETIN

FIG. 8

MANUAL PROCESSING SYSTEM

BACKGROUND OF THE INVENTION

1. Field of the Invention

The present invention relates to a manual processing system specifically to a customizing system of the content and format of a manual.

2. Description of the Related Art

For example, a maintenance manual document of an airplane amounts up to 100 thousand pages per one type of airplane. Airplane manufacturers issue a partly renewed maintenance manual about four times every year, in order to improve safety and to keep up with technological innovations. Also, the manufacturers generally issue a bulletin such as a list of errata irregularly, as additional and supplementary information.

On the other hand, users that operate the airplane are updating an old maintenance manual to a new one every time the maintenance manual is renewed. This updating procedure, such as checking the contents or inserting the user's original information, is still executed mainly manually; and, the automation and systemization of the updating procedure is strongly demanded. And in response to this, manufacturers are recently starting to issue maintenance manuals by electronic data.

This kind of problem is especially remarkable in a maintenance manual of an airplane. But the same kind of problem can be pointed out in regard to an operational manual of an airplane, and also to manuals of products other than the airplanes.

SUMMARY OF THE INVENTION

The present invention has been made in view of the above circumstances and provides a system of reducing labor for controlling and using a manual. The present invention is also to provide a system of processing a manual to facilitate its use.

In order to accomplish the above, a manual processing system according to one aspect of the invention, which processes original manual data provided to a user from a manufacturer to create customized manual data, includes a storing section for storing an insertion condition of an insertion data, and a processing section for inserting the insertion data in the original manual data according to the insertion condition.

According to the above configuration, the system stores the insertion condition of the insertion data in the storing section, and automatically executes the process of inserting the insertion data in the original manual based on the insertion condition. And, the user uses the manual customized as above. The user company itself may execute the processing of the manual, but it may also be consigned to a manual processing service company that executes the processing for the user company. Preferably, the storing section is able to associate a pointer indicating an entity of the insertion data with a location of insertion per each insertion data piece. Usually, the insertion data is data added to the original manual data, but in some cases, it may also be replaced data. Also, the insertion data includes data with various forms such as text data and graphic data. Instead of inserting the entity of the insertion data, the pointer that indicates the entity, or the reference information (URL) may be inserted.

Preferably, the insertion condition of the insertion data includes a first insertion condition table representing a correspondence between a specific description included in the original manual data and first insertion data added to the original manual data, and a second insertion condition table representing a correspondence between a specific location of the original manual data and second insertion data inserted in the specific location, and the processing section includes a first processing unit that retrieves the specific description from the original manual data and inserts the first insertion data by relating it to the specific description according to the contents of the first insertion condition table, and a second processing unit that inserts the second insertion data in the specific location in the original manual data according to the contents of the second insertion condition table.

According to the above configuration, the system is able to relate the first insertion data to the specific description as a supplement and a replacement, and is also able to insert the second insertion data in the specific location as a supplement and a replacement. Therefore, the customization of the manual data can be processed efficiently by using these two methods.

Preferably, the first insertion data possesses a translation sentence for the specific description, and the second insertion data includes at least one of the additional data provided by the manufacturer other than the original manual data or additional data originally possessed by the user. If the original manual is described in a foreign language, by utilizing the specific description of the foreign language as a key, text data of their own language can be inserted by associating it with the key. Also, according to the above configuration, the system will implement automated insertion in a manual of additional information provided by the manufacturer and additional data originally prepared by the user (including information from a government administrative agency).

Preferably, the system includes a table of contents creation section for creating a table of contents of manual data with the insertion data having been inserted. It is also preferred that the system includes an update history creation section for creating an update history table of manual data with the insertion data having been inserted. Since a data structure changes as the manual data is customized, the above sections manage to create the table of contents and update history in accordance with the contents of a new manual.

Further, a manual processing system according to another aspect of the invention, which processes original manual data provided to a user from a manufacturer to create customized manual data, includes a storing section for storing an insertion condition of insertion data, a processing section for inserting the insertion data in the original manual data according to the insertion condition, and a format changing section for executing a process of changing the format of a manual data with the insertion data having been inserted, whereby the system enables the user to use the manual data of which contents and format are customized, on the user side.

Preferably, the format changing section includes a section for marking a part where the insertion data has been inserted. Also preferably, the format changing section includes a section for marking a page where the insertion data has been inserted. For these marks, a vertical line to specify the inserted part of the insertion data, and a bulletin mark to specify the inserted page can be used.

Preferably, the format changing section includes a section for converting a series of the manual data with the insertion data having been inserted into plural pieces of page data, and a section for providing a layout corresponding to each piece of the page data. And when providing the layout, the user's original logo, and various kinds of information can be presented on the header or the footer.

Further, a method of creating manual data according to another aspect of the invention, which processes original manual data provided to a user from a manufacturer to create customized manual data, includes steps of registering an insertion condition of insertion data to a database, and inserting the insertion data in the original manual data on a computer, in accordance with the insertion condition of the insertion data, whereby the method enables the user to use the manual data customized by inserting the insertion data, on the user side.

Further, a storage medium relating to the invention stores a program of instructions to execute a function for processing original manual data provided to a user from a manufacturer to create customized manual data. The function includes the steps of of controlling an insertion condition of insertion data, and inserting the insertion data in the original manual data according to the insertion condition of the insertion data. A general conception of the storage medium includes portable storage media such as floppy disks and CD-ROM, as well as a device such as hard disks.

Further, according to another aspect of the invention, a method of manual processing service for providing a manual processing service between a manufacturer and a user, includes steps of registering an insertion condition of insertion data to a database, and inserting the insertion data-to the original manual data provided by the manufacturer on a computer in accordance with the insertion condition of the insertion data, whereby the manual data customized by inserting the insertion data is provided to the user.

According to the above configuration, a new service (type of business) of processing and customizing the manual can be implemented by making full use of the method of processing various kinds of generally known documents. Especially, if such a service provider exists between plural manufacturers and plural users, it will promote utilization common information.

BRIEF DESCRIPTION OF THE DRAWINGS

Preferred embodiments of the present invention will be described in detail based on the followings, wherein.

DETAILED DESCRIPTION OF THE INVENTION

A preferred embodiment of the invention will now be described with reference to the accompanying drawings.

Figure 1:
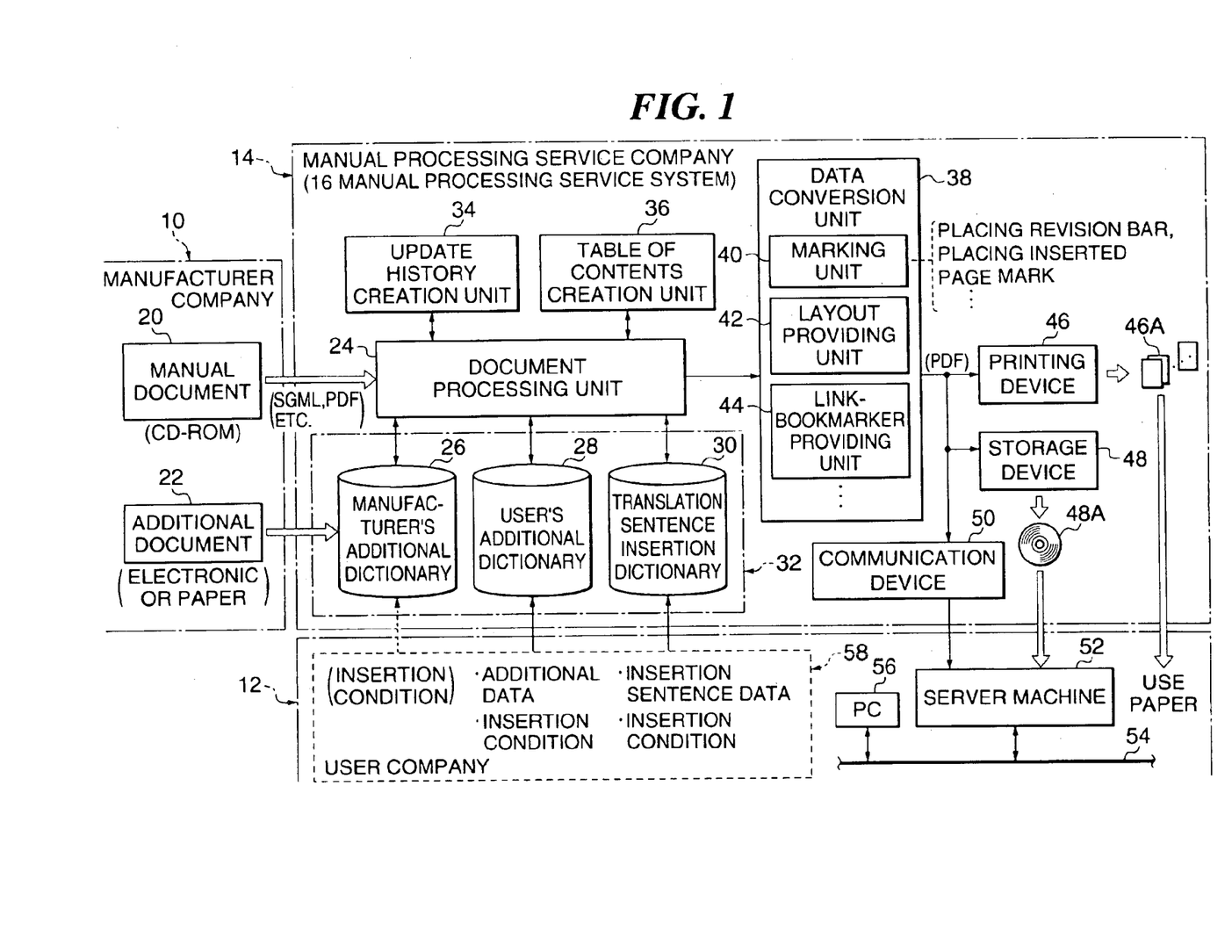
FIG. 1 is a block diagram illustrating a preferred embodiment of a manual processing service system relating to the invention.

FIG. 1 is a block diagram, which illustrates the overall configuration of the preferred embodiment of the manual processing service system relating to the invention.

Here, in FIG. 1, a manual processing service company 14 that possesses a manual processing service system 16, executes the processing to an original manual document 20 provided by a manufacturer company 10 on the basis of a preset processing condition, and then provides the customized manual document for a consideration, either as electronic information or as paper-printed information to a user company 12. Here, the manufacturer company 10 is, for example, an airplane manufacturer in the U.S., and the user company 12 is a Japanese airline company that operates a service by using the airplane. That is, in this embodiment, the manual document 20 is, for example, a maintenance manual of the airplane, and the document counts up to 100 thousand pages when printed out on papers. So, if the customizing is done manually, an extreme amount of labor will be required, but according to the embodiment, such customization of the manual will be handled by the manual processing service company 14.

The manufacture company 10 issues the manual document 20 regularly, for example, about 4 times every year. And, they are either acquired directly by the manual processing service company 14, or indirectly via the user company 12. Here, in this embodiment, the manual document 20 is provided in a form of CD-ROM, and the format of the document is SGML. Other than SGML, PDF can be used. Also, the manual document 20 can be acquired without using a CD-ROM, but on line via Internet, for example.

The manufacture company 10 irregularly issues an additional document 22 relating to the manual document 20, other than the regular issue of the manual document 20. The additional document 22 is, for example, a bulletin including a list of errata, and is provided either as electronic data or information printed on a paper. The additional document 22 includes data to be added on the contents of the manual document 20, or data to correct the contents thereof.

In the manual processing service system 16, each module possessing a data processing function such as a document processing unit 24 and a data conversion unit 38 is implemented on a computer that includes a CPU and a specific program. Here, in this embodiment, the unit of processing is a chapter that makes up the manual, but naturally, it is not limited to this.

The document processing unit 24 in the embodiment includes various functions, such as the function to insert the additional document (insertion data) 22 provided by the manufacturer in a specific location, the function to insert the additional document (insertion data) prepared originally by the user in the manual document, and the function to insert a translation sentence of a specific description contained in the manual document or inserted sentence data as text including the translation in the specific location of the description. Also, in relation to such document processing, the embodiment is provided with an update history creation unit 34 and a table of contents creation unit 36. However, these units are represented as separate entities from the document processing unit 24 on the configuration in FIG. 1, in view of convenience.

In FIG. 1, a manufacturer's additional dictionary 26, a user's additional dictionary 28, and a translation sentence insertion dictionary 30 are formed in a storage unit 32. Here, the manufacturer's additional dictionary 26 corresponds to a database for storing the additional document 22 provided by the manufacturer company 10. Also, the manufacturer's additional dictionary 26 stores an insertion condition of each additional document. That is, the manufacturer's additional dictionary 26 stores the entity of the insertion data and the insertion condition thereof. The relation between the insertion data and the insertion condition is described on a manufacturer's additional table illustrated later in FIG. 3.

The user's additional dictionary 28 stores the entity of the insertion data (additional data) created originally by the user company 12, and it corresponds to the database that stores the insertion condition of the insertion data. A user's additional table that illustrates the relation between the insertion condition and the entity of the insertion data will be discussed later, referring to FIG. 3.

The translation sentence insertion dictionary 30 corresponds to the database that stores the entity of the inserted sentence data as the translation sentence inserted additionally to the specific description of the manual document, and the insertion condition for inserting the entity thereof. A translation sentence insertion table representing the relation between the insertion data and the insertion condition will be discussed later, referring to FIG. 4.

The above insertion data and the insertion condition are indicated beforehand in a written document from the user company 12, or the electronic data containing them is provided to the manual processing service company 14. The symbol 58 in FIG. 1 conceptually shows the information representing the contents of such indications. Now, the additional document 22 usually has a description of the insertion condition in the additional document 22 itself issued by the manufacturer company 10, so that the insertion condition is stored as it is in the manufacturer's additional dictionary 26. But if such an insertion condition is not included, the user company 12 may designate the insertion condition separately. If the additional document 22 is provided as information printed on paper, the manual processing service company 14 will process the information into electronic data, and thereafter store the information in the manufacturer's additional dictionary 26.

The document processing unit 24 will further be explained in details. The document processing unit 24 makes reference to the manufacturer's additional table in the manufacturer's additional dictionary 26, and implements the process of inserting the additional document 22 to the manual document 20 according to the insertion condition in the table. Also, the document processing unit 24 makes reference to the user's additional table stored in the user's additional dictionary 28, and implements the process of inserting a user's additional data to the manual document 22 according to the insertion condition described in the user's additional table. Also, the document processing unit 24 makes reference to the translation sentence insertion table stored in the translation sentence insertion dictionary 30, retrieves the specific description described in the translation sentence insertion table from the manual document 20, and when the specific description is retrieved, implements the process of inserting the inserted sentence data after the specific description.

The document processing unit 24 may also include a translation function, for example, from English to Japanese. When it includes such a function, the system can advantageously reduce the volume of data prepared as a translation sentence. In the embodiment, a sentence in a fixed form is inserted as the translation sentence, but the translation sentence may be created dynamically in accordance with the contents of the manual document, and the created translation sentence may be inserted in the manual document.

The update history creation unit 34, as will be referred to later in FIG. 7, creates an update history table of the customized manual after the manual document 20 has been processed in various ways as above. Similarly, the table of contents creation unit 36 creates the table of contents in relation to the customized manual document. These units will be referred to later using FIG. 6.

The data conversion unit 38 includes functions, such as a marking unit 40, a layout providing unit 42, and a link-bookmarker providing unit 44, and also a format conversion function to convert the manual document inputted with the format of SGML into the manual document with the format of PDF. On such format conversion, all kinds of modules such as the marking unit 40, layout providing unit 42, link-bookmarker providing unit 44 respectively function to implement specified processes.

The marking unit 40, as will be referred to later using FIG. 8, includes a function for placing a predetermined revision bar for facilitating specification of the insertion data in the document, and a function for placing an inserted page mark to an inserted page. The layout providing unit 42 is a module for providing a layout of each page, in regard to the manual document divided by each page. In providing of the layout, as will be referred to later using FIG. 8, the layout providing unit 42 is capable of freely attaching header information and footer information. The link-bookmaker providing unit 44 includes a function to provide a generally known hyperlink between data as needed, and a well-known bookmaker providing function that can instantly specify a specific page to an image display, and so forth. For example, by providing the hyperlink between the table of contents and each page data piece created as above, the system has an advantage of instantly retrieving information related to these from the table of contents. Also, by providing a bookmarker to a page where important information is described, the system can advantageously and instantly specify the concerned page. Naturally, the functions of the data conversion unit 38 are not limited to the above, and it may include more functions to implement various well-known processes that can improve the usability of the manual document.

As described above, the file of the manual document data converted by the data conversion unit 38 is a file with the PDF format, and the file is outputted to one or more of a printing device 46, a storage device 48, and a communication device 50. Here, the printing device 46 is a device to print out the manual document on paper, thereby creating a manual document 46A as a paper medium. This will be delivered to the user company 12. Also, the storage device 48 is for storing the manual document as electronic data in a CD-ROM 48A, and the CD-ROM 48A will also be sent to the user company 12. Further, the communication device 50 is connected to a network, for example, the Internet, and the manual document as electronic data can be distributed to the user company 12 via the communication device 50.

At the user company 12, a server machine 52 is connected to an intranet 54 in the embodiment. And the server machine 52 reads out the information in the above CD-ROM 48A or the electronic information of the manual document via the Internet. The information is referred to by multiple client machines (PC) 56 that lie in the user company 12 via the intranet 54. Naturally, the paper manual documents are distributed to a maintenance section that uses the information.

Therefore, according to the above configuration, when the manufacturer company 10 issues the manual document 20 as electronic data, insertion data is inserted in a required location of the manual document according to a preset insertion condition, and thereby the manual document unique to the user company 12 is created. Thus, the user company 12 is relieved from the load of processing and controlling an enormous volume of the manual data, and can advantageously concentrate its labor on the essential operation. Also, the insertion data registered in the storage unit 32 can be used as it is even if the manual document 20 itself has changed. In such a case, the system has an advantage of being able to reuse the registered resources. Further, in the case of executing a manual processing service to plural airline companies using the same type of airplane, data sharing can be promoted among these companies. And as a result, there is an advantage of streamlining the manual processing service.

Figure 2:
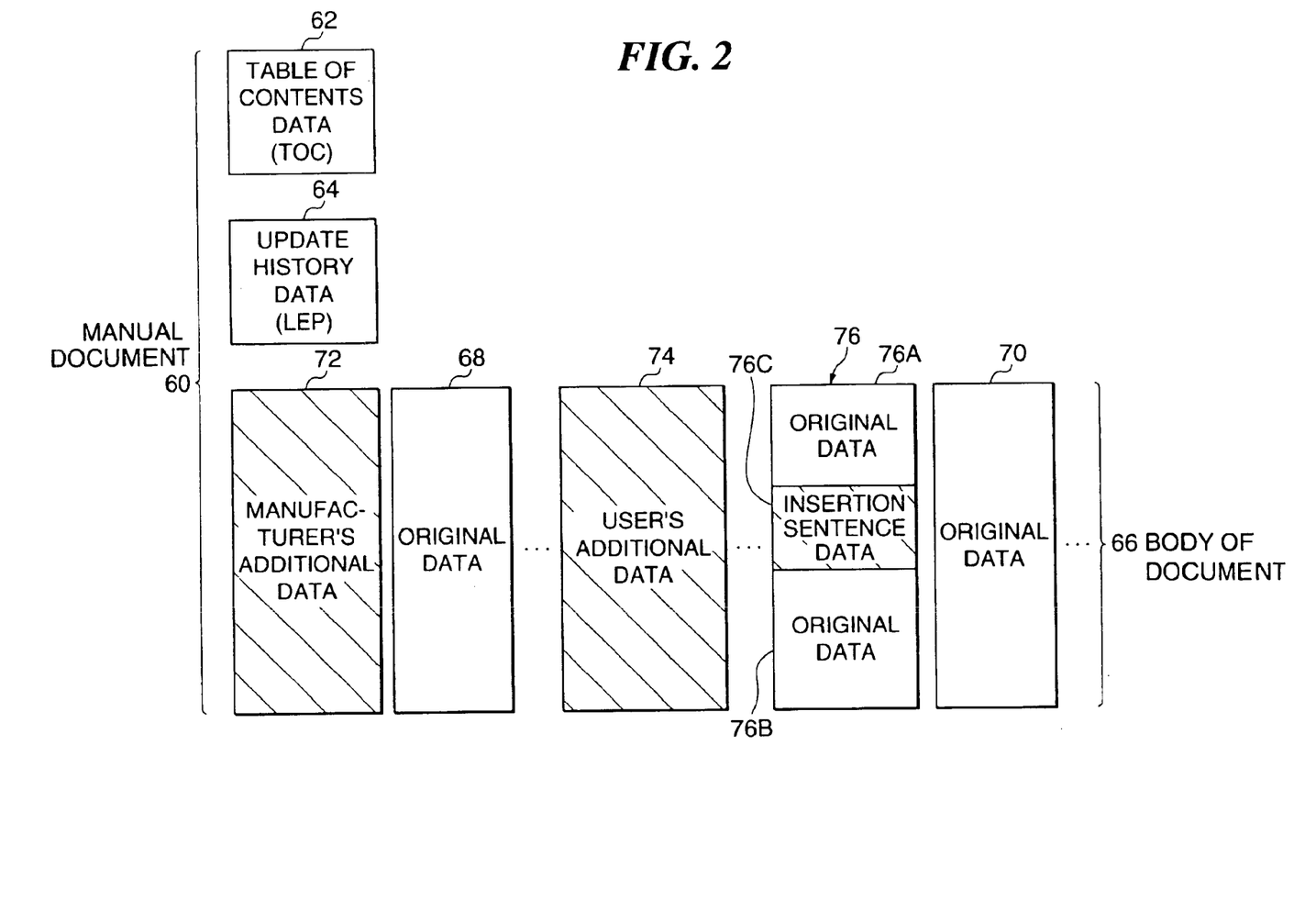
FIG. 2 is a conceptual diagram illustrating a construction of a manual document.

In FIG. 2, an example of a customized manual document 60 created by the manual processing service as shown in FIG. 1 is illustrated as a conceptual diagram. This manual document 60 corresponds to a specific chapter of the whole manual. Concretely, the manual document 60 is made up of a table of contents data 62, update history data 64, and a body of document 66. The body of document 66 includes plural pieces of original data 68 and 70, and also an inserted manufacturer's additional data 72 and a user's additional data 74, and so forth. Further, the body of document 66 includes data 76 with insertion data having been inserted partly. The data 76 includes within one page original data 76A, 76B, and also inserted sentence data 76C inserted by the document processing. The manufacturer's additional data 72, the original data 68 and 70, and the user's additional data 74 that constitute the body of document 66 are the data that each correspond to one page basically. On the other hand, the table of contents data 62 and the update history data 64 correspond to one or more pages.

Figure 3:
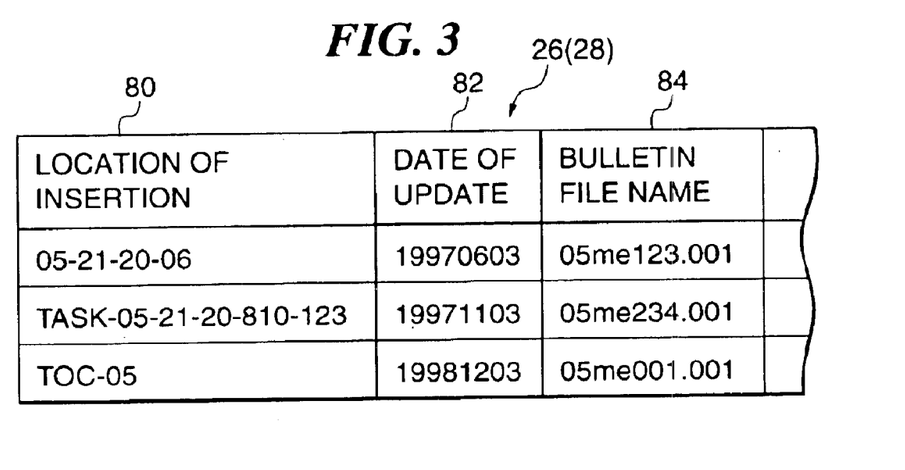
FIG. 3 is a chart illustrating a construction of a manufacturer's additional table and a user's additional table.

In FIG. 3, an example of a construction of the manufacturer's additional table included in the manufacturer's additional dictionary 26, and the user's additional table included in the user's additional dictionary 28 is illustrated. In this table, information such as an insertion location 80, update date and time 82, and a file name 84 are associated with each insertion data piece as additional data. In other words, when a certain insertion location is specified in the manual document, the entity of the file name associated with the insertion location is read out, and is inserted in the manual document.

Figure 4:
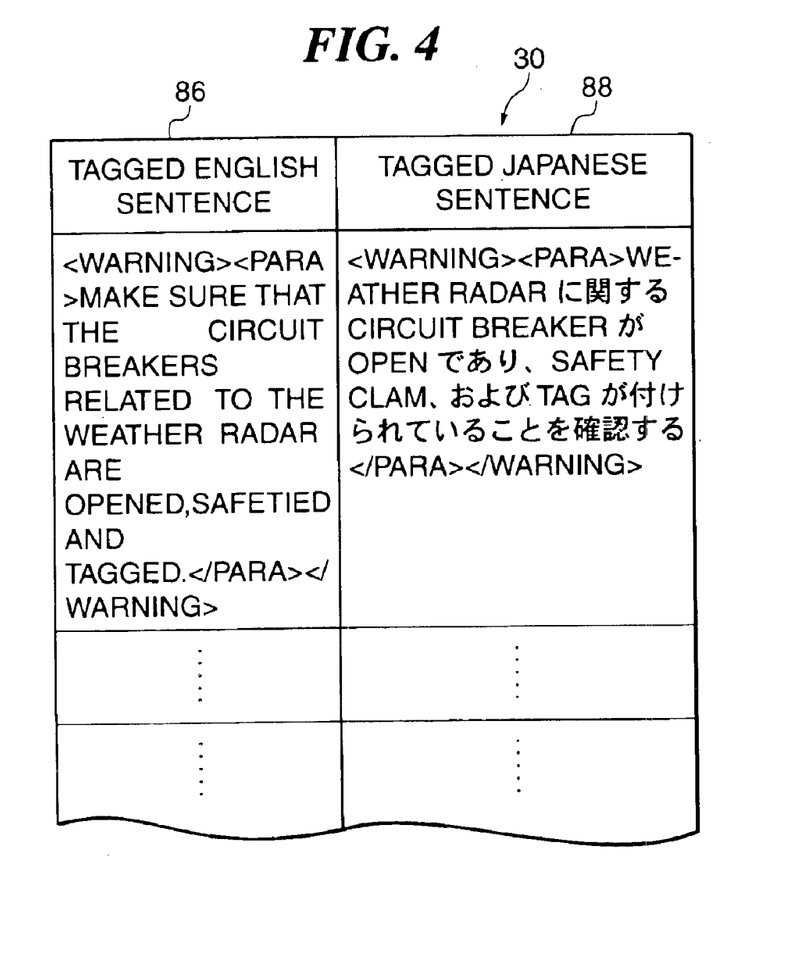
FIG. 4 is a chart illustrating a construction of a translation sentence insertion table.
Figure 5:
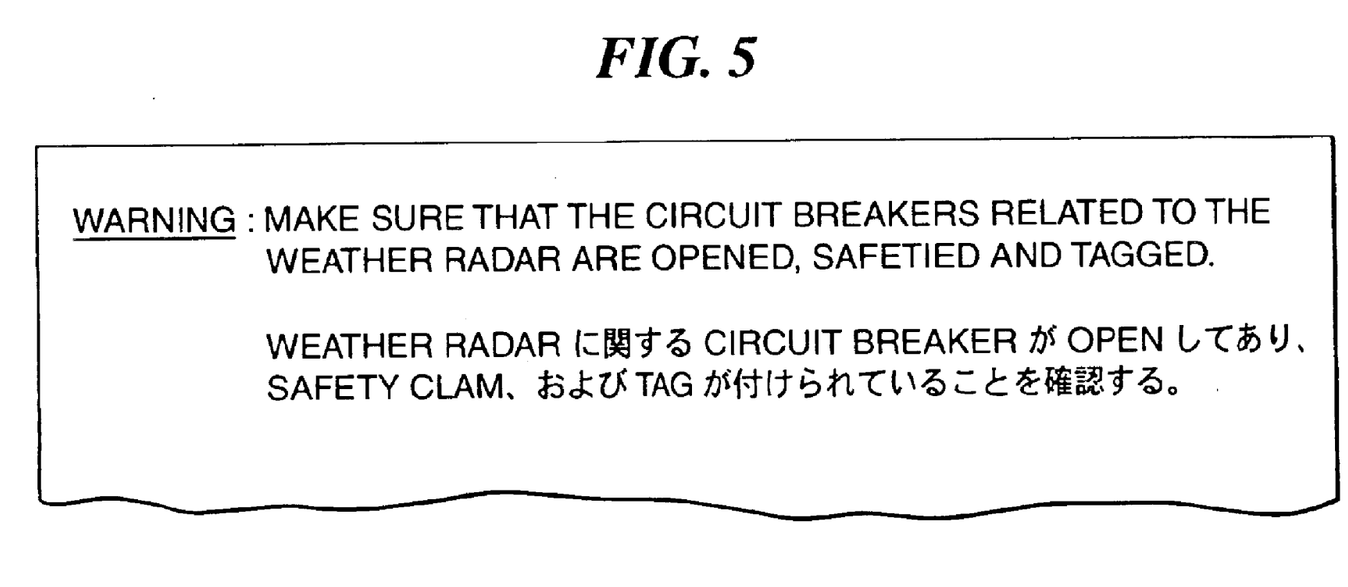
FIG. 5 is a chart illustrating an example of a description created in accordance with the translation sentence insertion table illustrated in FIG. 4.

Also, in FIG. 4, a concrete example of a construction of the translation sentence inserting table included in the translation sentence inserting dictionary 30 is shown. In FIG. 4, the left side represents a tagged English sentence 86 included in the manual document. And when such a specific description is retrieved, a tagged Japanese sentence 88 associated with the description is automatically inserted after the English sentence. Here, in the tagged Japanese sentence 88, a specific keyword in the tagged English sentence 86 is left, and the remaining parts are translated into Japanese, and they are actually transcribed as represented in FIG. 5, for example. That is, since each maintenance crew member needs to be especially well acquainted with the contents of "Warning", "Caution", and "Note" included in the English text, Japanese text information repeating the contents of such specific information will be inserted. The association represented in FIG. 4 is an example, and as long as a required translation sentence can be inserted, various structures can be adopted. In the example shown in FIG. 4, a tag represented by < > can be the object of retrieval, thus giving the advantage of quick retrieval of the specific description in the manual document. Needless to say, such a tag is attached during the step of the manufacturer company 10 creating the manual document 20.

Figure 6:
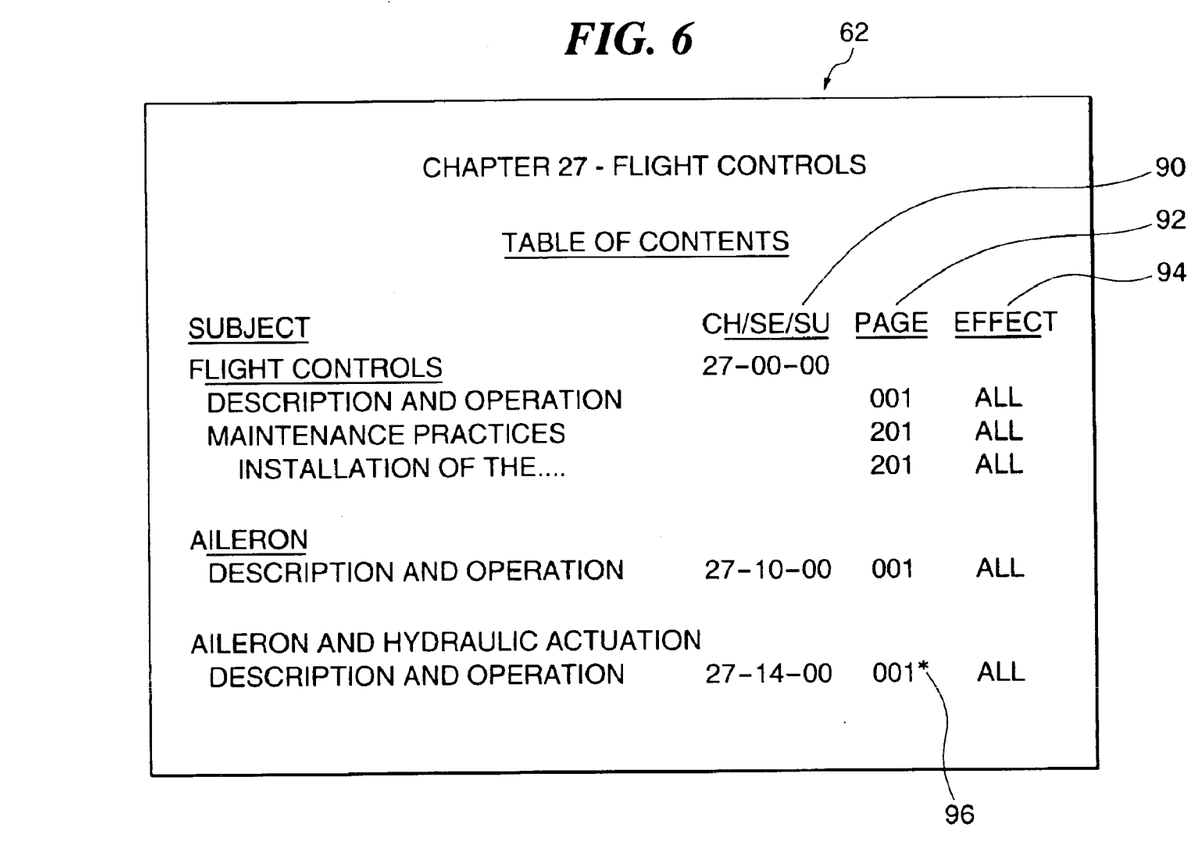
FIG. 6 is a chart illustrating an example of a table of contents created by a table of contents creation unit.
Figure 7:
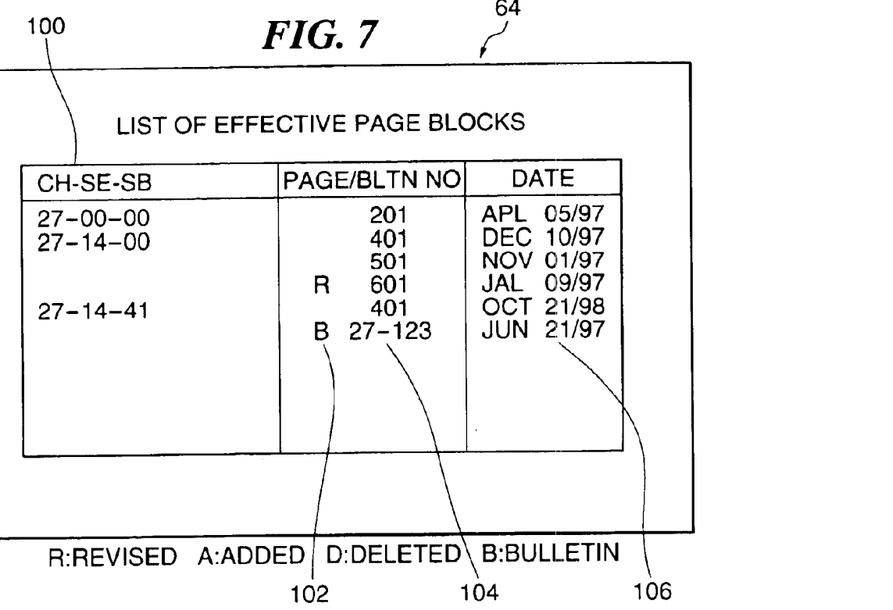
FIG. 7 is a chart illustrating an example of an update history table created by an update history creation unit.

In FIG. 6, a concrete example of the table of contents data 62 created by the table of contents creation unit 36 is shown. As shown in FIG. 6, the association is made among location information 90 and page number information 92 in each content (article) of the document and information 94 indicating whether the article is effective in a specific type of airplane or in every type of airplanes. Here, the location information 90 includes information specifying chapter, section, and subject. Also, "*" 96 is a flag (mark) to indicate the insertion data. It is needless to say that various constructions other than this can be adopted as the construction of the table of contents. FIG. 7 illustrates a constructional example of the update history creation table (update history data) 64 created by the update history creation unit 34. In the table, the symbol 100 represents the information of location in the document. A data block is identified by this information in the symbol 100. The symbol 102 attached to information 104 indicates the attribute of the insertion data. "R" indicates revised data, "A" indicates additional data, "D" indicates deleted data, and "B" indicates a bulletin as noted above. It is needless to say that various constructions other than this can be adopted as the update history table.

Figure 8:
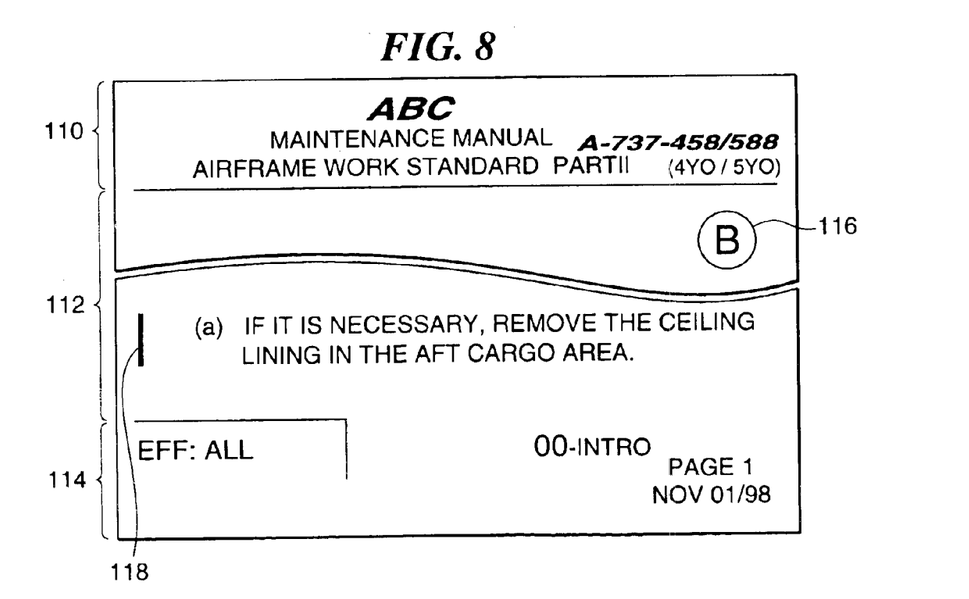
FIG. 8 is a chart illustrating an example of a processed result by a data conversion unit.

FIG. 8 illustrates a result of conversion by the data conversion unit 38. In FIG. 8, symbol 110 represents a header area, symbol 114 a footer area, and symbol 112 a body of the text. In the header area 110, the logo of the user company 12, a title, and also a type of airplane number or an identifier, and the like to which the information is applied are described. Also, in the footer area 114, information whether the information is effective in a specified type of airplane or in every type of airplane, or information concerning a page number or the date and time of creation is included. Also, in the body of text area 112, a revision bar 118 associated with the insertion data is placed as a vertical line. To be concrete, the revision bar 118 is placed vertically along the left margin of the insertion data. And by recognizing such mark, it is possible to understand easily which description has been inserted. It is also possible to underline the insertion data, but generally in manuals, an underline is used for regular expressions, therefore the embodiment specially uses the vertical line for the revision bar 118. Also, the mark with "B" in the circle indicated by symbol 116 indicates that the page was inserted, in other words, that it is a bulletin. By adding these marks separately, it is possible to clearly recognize the inserted pages.

It is needless to say that the format shown in FIG. 8 is just an example and that various kinds of format other than this can be adopted. According to the embodiment, the user company 12 will have the advantage of easily specifying a suitable format without people's labor.

Figure 9:
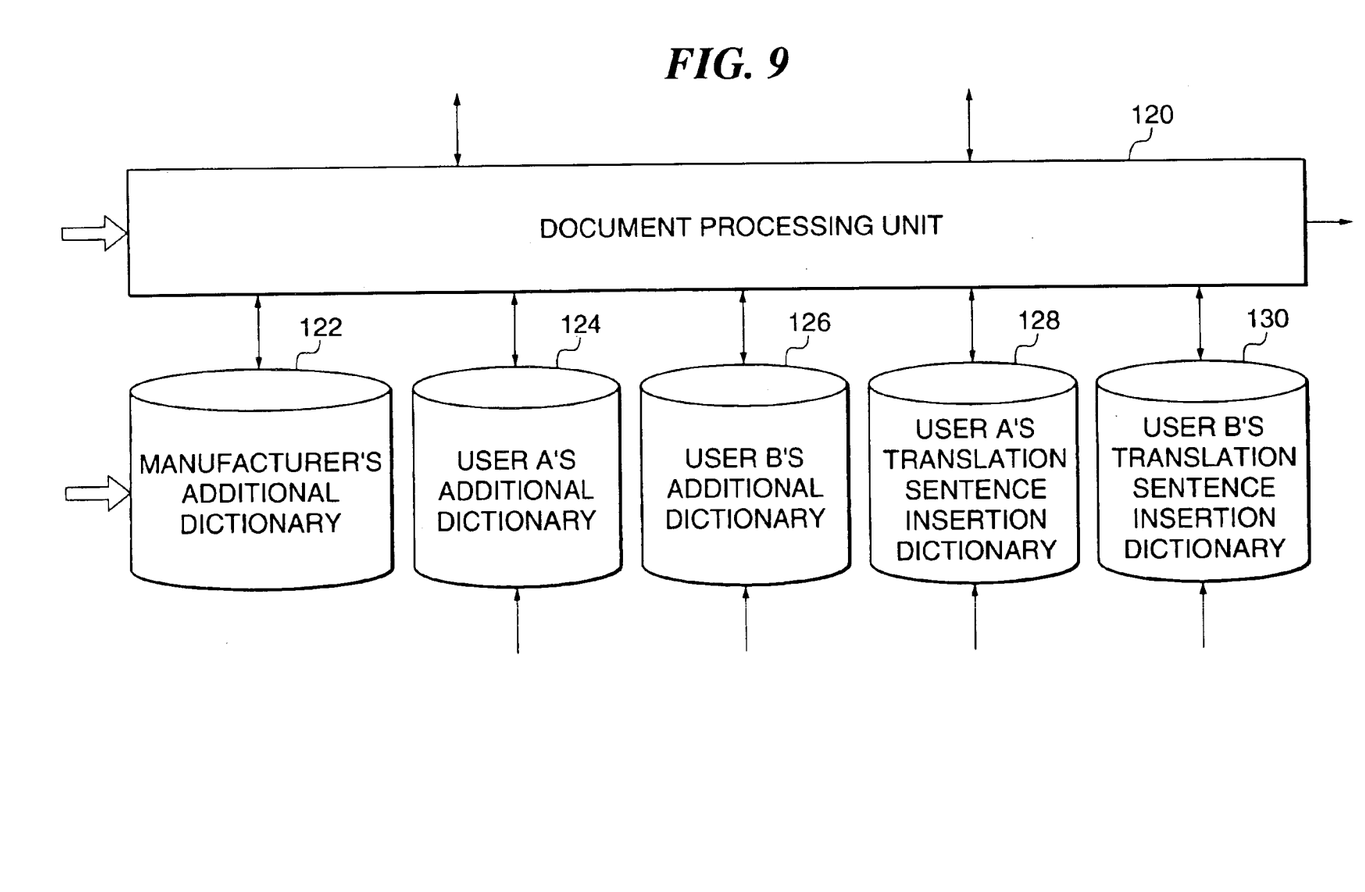
FIG. 9 is a block diagram illustrating a modified example of the manual processing service system.

FIG. 9 illustrates a modified example of the manual processing service system shown in FIG. 1, as to a main part of the configuration. According to the system relating to this modified example, a proxy service for plural user companies is implemented at the document processing unit 120. And additional dictionaries 124 and 126, and translation sentence insertion dictionary 128 and 130, are provided for respective user companies A and B. However, since the two user companies use the same type of airplane, the additional document provided by the manufacturer company 10 can be commonly used by both companies. Accordingly, only one of the manufacturer's additional dictionary 122 is set up, which is shared. Similarly, in the case where there are plural manufacturer companies to only one user company, the manual processing service can be implemented with a single document processing unit. Further, between plural manufacturer companies and plural user companies, the manual processing service can be implemented by a single document processing unit.

As described above, according to the present invention, the labor accompanied with manual processing can be reduced, and the usability of the manual can be improved.

The entire disclosure of Japanese Patent Application No. 2000-276148 filed on Sep. 12, 2000 including specification, claims, drawings and abstract is incorporated herein by reference in its entirety.

What is claimed is:

1. A manual processing system that processes original manual data to create customized manual data, comprising:
   storing means for storing first and second insertion conditions of insertion data to be inserted; and
   processing means for inserting the insertion data in the original manual data according to the first and second insertion conditions,
   wherein the first insertion condition represents a correspondence between a specific description included in the original manual data and first insertion data to be added to the original manual data and the second insertion condition represents a correspondence between a specific location of the original manual data and second insertion data to be inserted in the specific location.

2. The manual processing system according to claim 1, wherein:
   the first and second insertion conditions being tables representing the correspondences, and
   the processing means comprises:
   a first processing unit that retrieves the specific description from the original manual data and inserts the first insertion data by relating it to the specific description according to the contents of the first insertion condition table, and
   a second processing unit that inserts the second insertion data in the specific location in the original manual data according to the contents of the second insertion condition table.

3. The manual processing system according to claim 2, wherein:
   the first insertion data possesses a translation of the specific description, and
   the second insertion data includes additional data other than the original manual data.

4. The manual processing system according to claim 1, further comprising means for creating a table of contents of manual data in which the insertion data has been inserted.

5. The manual processing system according to claim 1, further comprising means for creating an update history table of manual data in which the insertion data has been inserted.

6. A manual processing system that processes original manual data to create customized manual data, comprising:
   storing means for storing first and second insertion conditions of insertion data to be inserted;
   processing means for inserting the insertion data in the original manual data according to the first and second insertion conditions; and
   format changing means for executing a process of changing a format of the manual data with the insertion data having been inserted,
   wherein the first insertion condition represents a correspondence between a specific description included in the original manual data and first insertion data to be added to the original manual data and the second insertion condition represents a correspondence between a specific location of the original manual data and second insertion data to be inserted in the specific location.

7. The manual processing system according to claim 6, wherein the format changing means includes means for marking a part where the insertion data has been inserted.

8. The manual processing system according to claim 6, wherein the format changing means includes means for marking a page where the insertion data has been inserted.

9. The manual processing system according to claim 6, wherein the format changing means includes:
   means for converting a series of the manual data with the insertion data having been inserted into plural pieces of page data, and
   means for providing a layout for each piece of the page data.

10. A method that processes original manual data to create customized manual data, comprising the steps of:
    registering first and second insertion conditions of insertion data to be inserted with a database; and
    inserting the insertion data in the original manual data on a computer, in accordance with the first and second insertion conditions of the insertion data,
    wherein the first insertion condition represents a correspondence between a specific description included in the original manual data and first insertion data to be added to the original manual data and the second insertion condition represents a correspondence between a specific location of the original manual data and second insertion data to be inserted in the specific location.

11. A storage medium readable by a computer, the storage medium storing a program of instructions executable by the computer to perform a function for processing original manual data to create customized manual data, the function comprising the steps of:
    controlling first and second insertion conditions of insertion data to be inserted; and
    inserting the insertion data in the original manual data according to the first and second insertion conditions,
    wherein the first insertion condition represents a correspondence between a specific description included in the original manual data and first insertion data to be added to the original manual data and the second insertion condition represents a correspondence between a specific location of the original manual data and second insertion data to be inserted in the specific location.

12. A method of providing a manual processing service between a manufacturer and a user, comprising the steps of:
    registering insertion conditions of insertion data to be inserted with a database; and
    inserting the insertion data in the original manual data provided by the manufacturer on a computer in accordance with the insertion conditions of the insertion data, thus providing the manual data customized by inserting the insertion data to the user,
    wherein the insertion conditions include at least a first insertion condition that represents a correspondence between a specific description included in the original manual data and first insertion data to be added to the original manual data and a second insertion condition represents a correspondence between a specific location of the original manual data and second insertion data to be inserted in the specific location.

13. A manual processing system that processes original manual data to create customized manual data, comprising:

a memory that stores insertion conditions of insertion data to be inserted; and a processor that processes the insertion data to be inserted into the original manual data according to the insertion conditions, wherein the insertion conditions include at least a first insertion condition that represents a correspondence between a specific description included in the original manual data and first insertion data to be added to the original manual data, and a second insertion condition represents a correspondence between a specific location of the original manual data and second insertion data to be inserted in the specific location.

14. The manual processing system according to claim 13, wherein:

the first and second insertion conditions being tables representing the correspondences, and the processor comprises:

a first processing unit that retrieves the specific description from the original manual data and inserts the first insertion data by relating it to the specific description according to the contents of the first insertion condition table, and a second processing unit that inserts the second insertion data in the specific location in the original manual data according to the contents of the second insertion condition table.

15. The manual processing system according to claim 14, wherein:

the first insertion data possesses a translation of the specific description, and the second insertion data includes additional data other than the original manual data.

16. The manual processing system according to claim 13, further comprising the processor creating a table of contents of manual data in which the insertion data has been inserted.

17. The manual processing system according to claim 13, further comprising the processor creating an update history table of manual data in which the insertion data has been inserted.

18. A manual processing system that processes original manual data to create customized manual data, comprising:

a memory that stores first and second insertion conditions of insertion data to be inserted;

a processor that inserts the insertion data in the original manual data according to the first and second insertion conditions and executes a process of changing a format of the manual data with the insertion data having been inserted, wherein the first insertion condition represents a correspondence between a specific description included in the original manual data and first insertion data to be added to the original manual data and the second insertion condition represents a correspondence between a specific location of the original manual data and second insertion data to be inserted in the specific location.

19. The manual processing system according to claim 18, wherein the processor marks a part where the insertion data has been inserted.

20. The manual processing system according to claim 18, wherein the processor marks a page where the insertion data has been inserted.

21. The manual processing system according to claim 18, wherein the processor converts a series of the manual data with the insertion data having been inserted into plural pieces of page data, and provides a layout for each piece of the page data.

* * * * *